Patented June 1, 1926.

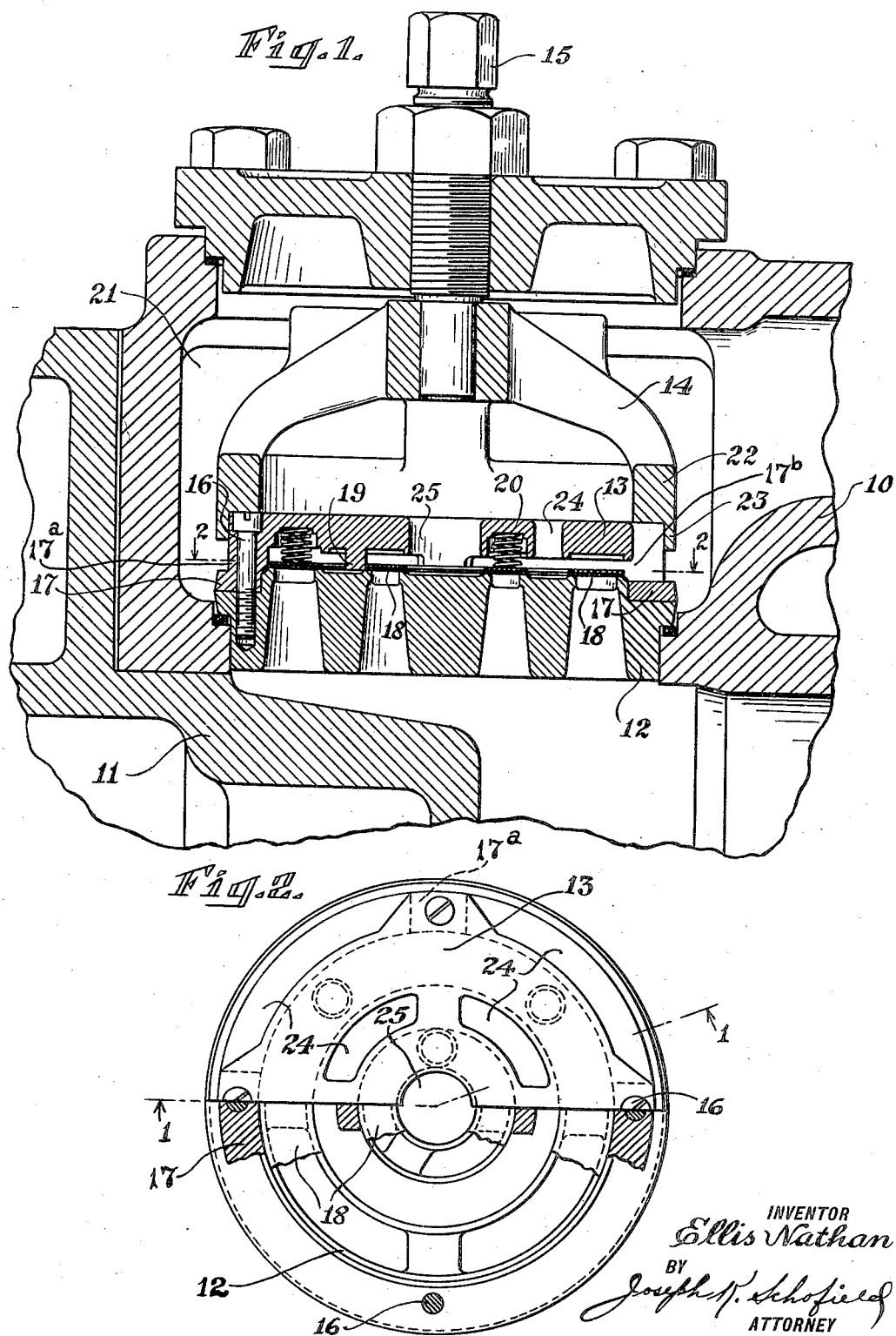

1,586,832

UNITED STATES PATENT OFFICE.

ELLIS NATHAN, OF EASTON, PENNSYLVANIA, ASSIGNOR TO PENNSYLVANIA PUMP & COMPRESSOR COMPANY, OF EASTON, PENNSYLVANIA, A CORPORATION OF PENNSYLVANIA.

COMPRESSOR VALVE.

Application filed April 1, 1925. Serial No. 19,905.

This invention relates to compressor valves and particularly to a valve assembly for compressors of improved form and in which an increased area of passages for the fluid being compressed is provided through the cover plate and adjacent parts, and additional convenience in assembling provided.

It is a primary object of the present invention to provide a valve seat, a cover plate, and a valve or valves adapted to operate between them, the cover plate being so formed that it is securely fastened to the valve seat adjacent the periphery of these members.

It is a further object of the invention to retain the valve seat and cover plate in place within the cylinder walls of the compressor by a yoke member engaging the periphery of the valve assembly, thus eliminating the necessity of a central bolt for retaining these members together which occupies a large amount of space.

It is a further object of the invention to provide a valve assembly having an increased area of fluid openings through the cover plate or guard so that the efficiency of the valve may be increased.

With these and other objects in view my invention consists in the features of construction and operation set forth in the following specification and illustrated in the accompanying drawings.

In the accompanying drawings annexed hereto and forming a part of this specification, I have shown my invention embodied in a discharge valve for a compressor, but it will be understood that the invention can be otherwise embodied and that the drawings are not to be construed as defining or limiting the scope of the invention, the claims appended to this specification being relied upon for that purpose.

Fig. 1 is a central sectional view taken on line 1—1 of Fig. 2 showing the valve assembly and adjacent parts of a compressor and Fig. 2 is a plan view of the cover plate and valve seat, the cover plate being broken away to more clearly show the valve plate.

In the above drawings I have shown but one embodiment of the invention which is now deemed preferable, but it is to be understood that changes and modifications may be made within the scope of the appended claims without departing from the spirit of the invention.

Briefly, and in its broadest aspect, my invention consists in the following principal parts: first, a valve seat having a plurality of openings or ports extending through it for the passage of the fluid being compressed; second, a cover plate also having openings or ports; third, a valve or valves interposed between the valve seat and cover plate and adapted to open and close communication between the openings in the valve seat and cover plate; fourth; a flange or ring on the cover plate co-acting with a mating flange on the valve seat, and members in the form of projections from the cover plate, tying the cover plate and ring together and providing a passage for the fluid being compressed between the plate and ring; fifth, fastening means for the valve seat and cover plate in the form of cap screws positioned about the peripheries of the valve seat and cover plate; and sixth, a yoke engaging the periphery of the valve assembly for retaining the parts in position within the walls of the compressor cylinder.

Referring more in detail to the figures of the drawing, at 10 I show the walls of a compressor to which is attached a cylinder head 11. Within an opening adjacent one end of the cylinder 10 is mounted the valve assembly forming the present invention. This assembly comprises a valve seat 12, a cover plate 13, and yoke member 14 which is retained in place by means of a screw 15. In the illustrated form of the invention the valve shown is of the discharge type; it will be understood, however, that inlet valves may also be provided with the present improvements in which the positions of the valve seat 12 and cover plate 13 relative to the cylinder 10 will be reversed.

The valve seat 12 as shown is retained within a counterboard or recessed seat formed in the compressor wall 10. To this valve seat 12 is directly fastened a cover plate 13 by means of screw 16. The cover plate 13, about its periphery, is provided with a flange ring 17, the lower surface of which contacts with the upper peripheral surface of the valve seat 12. This cover plate 13 and ring 17 are tied together and properly spaced by the members 17$^a$ integral therewith. Preferably four of these projections 17ª are provided spaced apart equally about the periphery of the cover plate 13 and through them extend the screws 16 for holding the valve seat 12 and cover plate 13 together.

Between the valve seat 12 and cover plate 13 are adapted to be retained the valves 18, two of these being shown in the form of flat rings one within the other. The outer ring valve 18 is retained in position by means of the inner walls of the projections 17ª, and the inner ring by several spaced lugs 19 depending from intermediate parts of the cover plate 13. Both of the ring valves 18 are held toward the valve seat 12 by coiled springs 20 and in their closed position prevent compressed fluid within the discharge passages 21 from re-entering the cylinder. In their open positions the valves 18 permit fluid to pass freely from the cylinder to the passages 21 through the openings in the valve seat and cover plate.

Heretofore in valves of the ring or annular type it has been the general and approved practice to fasten a valve seat and cover plate of compressor valves together by means of a central stud or bolt. The passages for the fluid being compressed through the valve seat and cover plates are therefore restricted to the space surrounding this bolt. The openings or passages for the fluid through the valve seat and cover plate are not ample enough to pass the fluid being compressed without unduly increasing the velocity which therefore reduces the efficiency. By eliminating the central bolt or stud the space previously occupied is made available for increasing the area of the fluid passages through the valve and thus increasing the efficiency of the valve. In the present form the retaining means for the valve seat 12 and cover plate 13 are located entirely at the periphery of these two members so that the entire central area is usable as fluid passages. These retaining means, as shown clearly in Fig. 1, comprise the cap screws 16 having their heads countersunk within the cover plate 13 and being threaded into the valve seat 12. One of these screws 16 is provided in each of the projections 17 so that these members are held together at four spaced points.

To retain the valve seat 12 and cover plate 13 in position, the yoke member 14 has an annular portion 22 in contact with the upper surface of the cover plate 13. Preferably also an annular flange 23 fits around the cover plate 13 as shown in Fig. 1. By means of the screw 15 the yoke member 14 is forced downward against the cover plate 13 to hold this plate 13 and valve seat 12 tightly in position.

As will be seen from Figs. 1 and 2, the cover plate 13 is provided with a plurality of arcuate openings or passages 24 and also with a central opening 25, thus giving an enlarged space through which the fluid being compressed may pass after passing through the valves 18. The additional space obtained by means of the central opening 25 adds materially to the efficiency of the valve as compared with that of the usual type in which this space is taken up by the central bolt. Also, space 17ᵇ about the periphery of the cover plate 13, except where the projections 17 are located, permits the fluid to escape around the outside of this plate.

The screws 16 for retaining the cover plate 13 in position against the valve seat 12 have their heads flush with the upper surface of the cover plate and are covered by the annular portions 22 of the yoke member 14 so that they cannot become loosened. The valve seat 12 and cover plate 13 are therefore always held in fixed relation without danger of their becoming disengaged.

It will be understood that in the case of inlet valves, in which the positions of the valve seat 12 and cover plate 13 are reversed, the flange ring 17 of the cover plate 13 will fit within the recessed opening in the cylinder. The heads of the screws 16 will therefore bear against the bottom of this recess and thus be prevented from loosening. To prevent the valves from being positioned to operate as inlet valves in the openings of the cylinder walls designed for discharge valves, the outside diameter of the cover plate 13 is made slightly different than the outside diameter of the valve seat 12. The valve assembly therefore cannot be inserted in position to operate as an inlet in those openings designed for discharge valves. Also, if the valves are placed as discharge valves in the openings for inlet valves, the looseness of the fit is at once noticeable. The part outstanding from the wall of the cylinder is the larger in diameter. This in the discharge valve shown is the cover plate 13. In the case of inlet valves the valve seat 12 is the part outstanding and is made larger than the cover plate 13. In either case, the flange 23 on the yoke member closely engages the outside diameter of the outstanding part.

What I claim is:

1. A valve for compressors comprising in combination, a valve seat, a cover plate, valves disposed between them, projections depending from said cover plate at its periphery, a flange ring formed integrally with said projections and spaced from said cover plate, and means extending through said projections for retaining said seat and plate together.

2. A valve for compressors comprising in combination, a valve seat, a cover plate, valves disposed between them, a flange ring integral with but spaced from the body portion of said cover plate whereby openings are formed between the cover plate and flange ring, means located at the peripheries of said seat and plate for retaining them together, and a yoke member engaging said plate at its peripheries and covering said holding means for holding said seat and plate together.

3. A valve for compressors comprising in combination, a valve seat, a cover plate, valves disposed between them, a flange ring integral with said cover plate, projections depending from said cover plate at its periphery and joining the flange ring therewith, means extending through said projections for retaining said seat and plate together, and a yoke member engaging said plate at its periphery for holding said seat and plate in operative position.

4. A valve for compressors comprising in combination, a valve seat, a cover plate, valves disposed between them, projections depending from said cover plate at its periphery, screws extending through said projections for retaining said seat and plate together whereby the fluid being compressed may pass through spaces between said projections, a yoke member having an annular portion engaging the periphery of said cover plate, said annular portion adapted to cover and hold said screws in position, and means engaging the yoke member to retain all of said members in operative position.

5. A valve for compressors comprising in combination, a valve seat, a cover plate, valves disposed between them, and means located at the peripheries of said seat and plate for retaining them together, said seat and plate having coacting flange rings at their peripheries permitting the fluid being compressed to pass between one of said flanges and the cover plate.

6. A valve for compressors comprising in combination, a valve seat, a cover plate, a valve disposed between them, and means located at the peripheries of said seat and plate for retaining them together, said plate having at its periphery a flange ring integrally formed therewith but spaced from said cover plate, whereby said valve can be positioned as an inlet valve and the fluid being compressed permitted to pass between said plate and flange ring, said flange ring forming a seat therefor.

7. A valve for compressors comprising in combination, a valve seat, a cover plate, valves disposed between the seat and plate, means at the peripheries of said seat and plate for retaining them together, a spaced flange ring on said cover plate forming fluid openings between said cover plate and ring, the peripheries of said valve seat and flange ring having different outside diameters, whereby said valves are prevented from being improperly positioned.

8. A valve for compressors comprising in combination, a valve seat, a cover plate, coacting flange rings on the outside diameters of said seat and plate, valves disposed between the seat and plate, spaced projections connecting one of said flange rings whereby fluid may pass between said cover plate and ring, and means for holding said seat and plate together, the peripheries of said seat and ring having different diameters whereby they are prevented from being improperly positioned.

In testimony whereof, I hereto affix my signature.

ELLIS NATHAN.